| United States Patent [19] | [11] Patent Number: 4,960,602 |
|---|---|
| Talkington et al. | [45] Date of Patent: Oct. 2, 1990 |

[54] FOOD OR BEVERAGE COMPOSITIONS WITH ALTERED FLAVORED DISPLAY

[75] Inventors: Sherry R. Talkington, Florence, Ky.; Susan S. Abe, Mason; Marko D. Mijac, Cincinnati, both of Ohio

[73] Assignee: The Procter & Gamble Company, Cincinnati, Ohio

[21] Appl. No.: 374,430

[22] Filed: Jun. 30, 1989

Related U.S. Application Data

[63] Continuation of Ser. No. 175,406, Apr. 13, 1988, abandoned, which is a continuation-in-part of Ser. No. 47,367, May 6, 1987, abandoned.

[51] Int. Cl.$^5$ .............................................. A23D 9/00
[52] U.S. Cl. .................................... 426/534; 426/590; 426/601; 426/607; 426/611; 426/804
[58] Field of Search ............... 426/601, 607, 613, 534, 426/549, 580, 589, 590, 602, 603, 613, 615, 804 611

[56] References Cited

U.S. PATENT DOCUMENTS 3,158,490 11/1964 Baur et al. .
4,005,196 1/1977 Jandacek et al. .................... 514/23
4,789,664 12/1988 Seligson et al. .
4,797,300 1/1989 Jandacek et al. .
4,880,657 11/1989 Guffey et al. .

FOREIGN PATENT DOCUMENTS 0287157 10/1988 European Pat. Off. .
0290065 11/1988 European Pat. Off. .
0311154 4/1989 European Pat. Off. .

OTHER PUBLICATIONS

Mattson et al., "The Effect of a Non-Absorbable Fat . . .", *J. Nutrition* 109, #10, pp. 1688–1693, (Oct. 1979).
Mattson et al., "The Effect of a Nonabsorbable Lipid . . .", *J. Nutrition* 106, #6, pp. 747–752, (Jun. 1976).
Fallat et al., "Short Term Study of Sucrose Polyester . . .", Am. J. Clin. Nutr. 29, pp. 1204–1215, (Nov. 1976).

*Primary Examiner*—Donald E. Czaja
*Assistant Examiner*—Evan Federman
*Attorney, Agent, or Firm*—Gary M. Sutter; Ronald L. Hemingway; Richard C. Witte

[57] ABSTRACT

The present invention relates to food or beverage compositions having an altered flavor display. The compositions contain polar or intermediate polarity flavor compounds. In addition, the compositions contain a fat phase made from triglyceride fat in combination with a particular sucrose fatty acid ester having a viscous rheology and high liquid/solid stability.

16 Claims, No Drawings

FOOD OR BEVERAGE COMPOSITIONS WITH ALTERED FLAVORED DISPLAY

RELATED APPLICATIONS

This is a continuation of application Ser. No. 175,406, filed Apr. 13, 1988, now abandoned, which was a continuation-in-part of application Ser. No. 947,367, filed May 6, 1987, now abandoned.

TECHNICAL FIELD

The present invention relates to the area of foods and beverages, and in particular foods and beverages containing sucrose fatty acid esters.

BACKGROUND OF THE INVENTION

A number of references disclose food or beverage compositions made with sucrose fatty acid esters. For example, U.S. Pat. No. 3,600,186 of Mattson et al., issue Aug. 17, 1971, discloses low calorie fat-containing food compositions wherein from about 10% to about 100% of the total fat is a sugar or sugar alcohol polyester having at least 4 fatty acid ester groups, with each fatty acid having from about 8 to about 22 carbon atoms. The polyesters are said to be useful as a partial or complete replacement for normal triglyceride fat in salad or cooking oils, or plastic shortenings for use in frying, cake making, bread making, or the like.

U.S. Pat. No. 4,461,782 of Robbins et al., issued July 24, 1984, discloses baked products comprising from about 12% to about 60% of a nonabsorbable, nondigestible liquid polyol polyester and from about 25% to about 85% microcrystalline cellulose or a mixture of microcystalline cellulose and flour, in a weight ratio of cellulose:flour of at least 1:1. The preferred polyol polyesters are said to be sucrose hexaoleate, sucrose heptaoleate, and sucrose octaoleate.

U.S. Pat. No. 4,034,083 of Mattson, issued July 5, 1977, discloses vitamin-fortified polyol polyesters used in pharmaceutical compositions or foods for treating and/or preventing hypercholesterolemia, and U.S. Pat. No. 4,055,195 of Jandacek, issued Jan. 25, 1977, discoses liquid polyol polyesters combined with anti-anal leakage agents. The polyesters are said to be useful as a partial or complete replacement for normal triglyceride fats in a salad or cooking oil; in plastic shortenings for use in frying, cake making, bread making, and the like; or in mayonnaise, margarine, or dairy products.

Fallat et al., "Short Term Study of Sucrose Polyester a Nonabsorbable Fat-Like Materials as a Dietary Agent for Lowering Plasma Cholesterol", *The American Journal of Clinical Nutrition* 29, pp. 1204–1215 (November 1976), discloses a study in which the efficacy of sucrose polyester as a cholesterol-lowering agent was assessed. The polyester was used as a fat component in shortening, margarine, baked and sauteed foods, sauces, frostings, and candies.

European Patent Application 236,288 of Bernhardt, published Sept. 9, 1987, discloses low calorie fat materials having a particular rheology and liquid/solid stability. Preferred fat materials are sucrose fatty acid esters. The fat materials are disclosed as being useful as a replacement for triglyceride fat in a wide variety of food and beverage products, for example, baked goods, shortening and oil products, dairy products, meat products, sweet goods, nut spreads, and sauces.

U.S. Pat. No. 4,625,441 of Wolkstein, issued Dec. 2, 1986, discloses dietetic frozen desserts containing aspartame and sucrose fatty acid esters. Examples include ice cream, ice milk, frozen yogurt, sherbert, tofuti, and sorbet.

None of these references suggests that the flavor display of foods and beverages can be changed by the incorporation of particular kinds of sucrose fatty acid esters. More specifically, none of the references suggests the compositions required to produce this flavor display change.

Therefore, it is an object of the present invention to provide food and beverage compositions having an altered flavor display.

It is a related object of the present invention to provide the altered flavor display by the use of particular sucrose fatty acid esters.

It is another object of the present invention to provide food and beverage compositions that are reduced in calories compared to compositions containing only triglyceride fats.

These and other objects of the invention will become evident from the disclosure herein.

All parts, percentages, and ratios used herein are by weight unless otherwise indicated.

SUMMARY OF THE INVENTION

The present invention relates to food or beverage compositions having an altered flavor display. The compositions comprise:
(A) from about 5% to about 100% fat phase, wherein the fat phase comprises:
  (i) from about 5% to about 95% sucrose fatty acid ester containing at least four fatty acid ester groups, each fatty acid group having from about 8 to about 22 carbon atoms, wherein the sucrose fatty acid ester has an octaester content of at least about 75% and an iodine value between about 25 and 55, and wherein the sucrose fatty acid ester has:
    (a) a non-Newtonian plastic rheology at 100° F. (37.8° C.) and in particular a yield stress of not less than 150 dynes/cm$^2$, and a viscosity of not less than 15 poise at 100° F. (37.8° C.) after 10 minutes of steady shear at 10 sec.$^{-1}$;
    (b) a liquid/solid stability of not less than 50 percent at 100° F. (37.8° C.);
  (ii) wherein the sucrose fatty acid ester comprises not more than about 50% of the total food or beverage composition;
  (iii) from about 5% to about 95% triglyceride fat; and
  (iv) from about 0% to about 50% other fat ingredients;
(B) from about 0% to about 95% other food or beverage ingredients; and
(C) wherein the food or beverage composition contains polar or intermediate polarity flavor compounds, or mixtures thereof, that are at least slightly soluble in water.

DETAILED DESCRIPTION OF THE INVENTION

The flavor of a food or beverage product is defined by three flavor characteristics: aromatic components (as perceived with the sense of smell), taste components (salty, sweet, sour, bitter), and chemical feeling components (astringency, metallic, cooling, etc.). Food product flavor can be further classified and quantitated by the type of flavor characteristics displayed, the intensities of the characteristics, and the time release of these characteristics. Two products having similar flavor characteristics and intensities can be differentiated if the rate of release of the characteristics is different.

A flavor profile is composed of several parts. These include (1) the total amount of flavor released, (2) the maximum intensity of flavor, (3) the time it takes to perceive this maximum flavor intensity, (4) the lag time, or time it takes to first perceive the flavor, (5) and the total length of time flavor is perceived.

Surprisingly, it has now been discovered that particular sucrose fatty acid ester-containing food or beverage compositions have a flavor display that is different from the display present when the compositions contain only triglyceride fat. The flavor display is changed in several ways:

heightening some specific components;
suppressing other components;
changing the ordering of flavor components in the profile; and
changing overall flavor intensity and the rate the intensity is achieved.

For example, the overall flavor intensity (amplitude) of butter flavored and cheddar cheese flavored pie crust is heightened by the sucrose esters. Conversely, the overall flavor intensity is lower in sucrose ester-containing ice cream and mayonnaise products versus the conventional triglyceride fat products with the same flavor level. The order of the flavor components in the flavor profile is precevied as markedly different in the following products: margarine, mayonnaise, ice cream, chocolate frosting, and chocolate milkshakes. Diacetyl and vanillin flavors, for example, are heightened, and chocolate, saltiness, vinegar, and eggy notes are suppressed.

This discovery of an altered flavor display in certain sucrose fatty acid ester-containing food and beverage products is important because it allows the manipulation of flavor characteristics to produce the optimum products. Desirable flavors can be enhanced in food or beverage products, while undesirable flavors can be suppressed. The flavor display can be changed to suit a specific product need.

A food or beverage composition according to the present invention comprises:

(A) from about 5% to about 100% fat phase, wherein the fat phase comprises:
  (i) from about 5% to about 95% sucrose fatty acid ester containing at least four fatty acid ester groups, each fatty acid group having from about 8 to about 22 carbon atoms, wherein the sucrose fatty acid ester has an octaester content of at least about 75% and an iodine value between about 25 and 55, and wherein the sucrose fatty acid ester has:
    (a) a non-Newtonian plastic rheology at 100° F. (37.8° C.) and in particular a yield stress of not less than 150 dynes/cm$^2$, and a viscosity of not less than 15 poise at 100° F. (37.8° C.) after 10 minutes of steady shear at 10 sec.$^{-1}$,
    (b) a liquid/solid stability of not less than 50 percent at 100° F. (37.8° C.);
  (ii) wherein the sucrose fatty acid ester comprises not more than about 50% of the total food or beverage composition;
  (iii) from about 5% to about 95% triglyceride fat; and
  (iv) from about 0% to about 50% other fat ingredients;
(B) from about 0% to about 85% other food or beverage ingredients; and
(C) wherein the food or beverage composition contains polar or intermediate polarity flavor compounds, or mixtures thereof, that are at least slightly soluble in water.

As indicated hereinabove, the fat phase of the present compositions comprises from about 5% to about 95% of a particular kind of sucrose fatty acid ester. The sucrose fatty acid esters of the present invention are esterified with at least four fatty acid groups. These compounds are prepared by reacting a sucrose with fatty acid as discussed below. The sucrose starting material must be esterified on at least four of the hydroxyl groups with a fatty acid containing from about 8 to about 22 carbon atoms, and preferably from about 14 to about 18 carbon atoms. Examples of such fatty acids include caprylic, capric, lauric, myristic, myristoleic, palmitic, palmitoleic, stearic, oleic, ricinoleic, linoleic linolenic, eleostearic, arachidic, arachidonic, behenic, and erucic acid. The fatty acids can be derived from naturally occurring or synthetic fatty acids; they can be saturated or unsaturated, including positional and geometrical isomers. The fatty acids esterified to the sucrose molecule are of mixed chain length to achieve the rheology and stability properties required herein.

The use of sucrose esters containing four or more fatty acid ester groups has the additional benefit of providing reduced calorie foods and beverages, because these esters are substantially non-digestible by the human body.

The sucrose fatty acid esters of the present invention have a non-Newtonian plastic rheology at 100° F. (37.8° C.). In particular, the sucrose fatty acid esters have a yield stress of not less than 150 dynes/cm$^2$, and a viscosity of not less than 15 poise at 100° F. (37.8° C.) after 10 minutes of steady shear at 10 sec$^{-1}$. The esters also have a liquid/solid stability of not less than 50% at 100° F. (37.8° C.), and preferably not less than 90%. In general terms, the esters can be described as being very viscous and plastic. The liquid portion of the esters does not readily separate from the solid portion.

The sucrose fatty acid esters can be a single type of ester or a mixture of esters. It is not critical that each type of ester has the above-mentioned physical properties as long as the sucrose esters as a whole have these physical properties.

Viscosity and yield stress are known rheological properties and can be measured by use of an instrument such as a plate and cone viscometer (e.g., a Ferranti-Shirley viscometer, manufactured by Ferranti Electric, Inc., 87 Modular Ave., Commack, NY 11725). Additional details are provided below under the Analytical Methods section. The basics of rheology are discussed in Idson, "Rheology: Fundamental Concepts," Cosmetics and Toiletries, Vol. 93, pp. 23–30 (July 1978), incorporated by reference herein.

The sucrose fatty acid esters used herein must also have an octaester content of at least about 75%, preferably at least about 80%, and most preferably at least about 85%. Esters having a lower octaester content were found to be ineffective in altering the flavor display of foods and beverages. Octaester content is measured by any standard method.

Food or beverage compositions containing very large amounts of the present sucrose fatty acid esters do not show an altered flavor display. Hence, the sucrose fatty acid esters of the present invention comprise not more than about 50% of the total food or beverage composition, preferably not more than about 35% and most preferably from about 3% to about 15%.

The present sucrose fatty acid esters are intermediate melting esters having an iodine value between about 25 and about 55, preferably between about 36 and about 55. Iodine value, often seen as "I.V.", is well known in oil technology and is a measure of the degree of saturation or unsaturation of a fat material's fatty acids. In general, the higher the I.V. the lower the melting point of the material, and vice versa. Iodine value is measured by the standard Wijs titration.

The sucrose fatty acids esters suitable for use herein can be prepared by a variety of methods known to those skilled in the art. These methods include: transesterification of the sucrose with methyl, ethyl or glycerol fatty acid esters using a variety of catalysts; acylation of the sucrose with a fatty acid chloride; acylation of the sucrose with a fatty acid anhydride; and acylation of the sucrose with a fatty acid, per se. As an example, the preparation of polyol fatty acid esters is described in U.S. Pat. Nos. 3,963,699; 4,517,360; and 4,518,772, (all incorporated by reference herein).

A specific, but non-limiting, example of the preparation of sucrose fatty acid esters suitable for use herein is the esterification of sucrose with methyl esters of a fully hydrogenated soy oil (I.V. 8) and a partially hydrogenated soy oil (I.V. 107) blended in a 45:55 ratio. In general, blends of two types of methyl esters can be used where one type is derived from an oil having an I.V. not more than about 12, and the other type is derived from an oil having an I.V. between about 90 and about 130. Specific, but non-limiting, examples of sucrose fatty acid esters suitable for use herein are esters made by esterifying sucrose with a blend of partially and nearly completely hardened soybean oil methyl esters, for example, esters having the following properties: (1) octaester content 84.5%; SFC at 50° F. (10° C.) of 71.8, at 70° F. (21° C.) of 64.2 at 80° F. (27° C.) of 51.1, at 92° F. (33° C.) of 33.2, and at 105° F. (41° C.) of 9.5; fatty acid composition of 11.5% $C_{16}$, 54.2% $C_{18}$, 17.9% $C_{18:1}$, 14.2% $C_{18:2}$, 1% $C_{18:3}$, 0.5% $C_{20}$, and 0.3% $C_{22}$; and I.V. of 42.6; or (2) octaester content of 92.1% at 50° F. (10° C.) of 61.2, at 70° F. (21° C.) or 48.4, at 80° F. (27° C.) of 36.2, at 92° F. (33° C.) of 19.2, and at 105° F. (41° C.) of 3.1; fatty acid composition of 9.8% $C_{16}$, 50.6% $C_{18}$, 21.6% $C_{18:1}$, 15.7% $C_{18:2}$, 1% $C_{18:3}$, 0.5% $C_{20}$ and 0.3% $C_{22}$; and I.V. of 48.6.

The fat phase of the present food or beverage compositions also comprises from about 5% to about 95% triglyceride fat, preferably from about 33% to about 90%, and most preferably from about 65% to about 90%. It has been found that the flavor display benefits of the present invention are optimized when the food or beverage compositions contain a high percentage of triglyceride fat compared to the percentage of sucrose fatty acid ester. Preferably, the ratio of sucrose fatty acid ester to triglyceride fat is not more than about 2:1, more preferably not more than about 1:1, and most preferably not more than about 1:2.

Especially appropriate for use in the present invention are triglycerides of straight chain or branched chain, saturated or unsaturated, monocarboxylic acids having from about 10 to 28 carbon atoms. Suitable sources of such oils include: (1) vegetable fats and oils such as soybean, corn, sunflower, rapeseed, low erucic acid rapeseed, canola, cottonseed, olive, safflower and sesame seed; (2) meat fats such as tallow or lard; (3) marine oils; (4) nut fats and oils such as coconut, palm, palm kernel, or peanut; (5) milkfat, butterfat; and (6) cocoa butter and cocoa butter substitutes such as shea, or illipe butter.

The triglyceride fats can be processed with one or more of the following processes: hydrogenation, winterization, dewaxing, interesterification, etc. Any standard processing method can be used to make the triglycerides.

From about 0% to about 50% of the fat phase of the present compositions can be comprised of other fat ingredients besides the triglycerides and particular sucrose fatty acid esters mentioned hereinabove. Preferably, these other fat ingredients comprise from about 0% to about 30% of the fat phase, and most preferably from about 0% to about 10%. For example, the other fat ingredients can be comprised of fatty acids, fatty alcohols, or esters of such acids and alcohols. The other fat ingredients can also be other noncaloric or reduced calorie fats, such as branched chain fatty acid triglycerides, triglycerol ethers, polycarboxylic acid esters, sucrose polyethers, neopentyl alcohol esters, silicone oils/siloxanes, and dicarboxylic acid esters. Other fat materials useful in the fat phase are medium chain triglycerides, highly esterified polyglycerol esters, acetin fats, plant sterol esters, polyoxyethylene esters, jojoba esters, mono-diglycerides of fatty acids, and mono-diglycerides of short-chain dibasic acids.

Other polyol fatty acid polyesters other than the particular sucrose fatty acid esters described hereinabove can also be used as other fat ingredients in the fat phase of the present invention. Preferred polyol fatty acid polyesters are other sugar fatty acid polyesters, sugar alcohol fatty acid polyesters, and polyglycerol fatty acid polyesters, and mixtures thereof. The sugar fatty acid polyesters and sugar alcohol fatty acid polyesters preferably contain from 4 to 8 hydroxyl groups. These include sucrose fatty acid esters outside the definition of those comprising 5% to 95% of the fat phase, for example esters having an octaester content less than about 75%, an iodine value not between about 25 and about 55, or a rheology or liquid/solid stability outside the definition given hereinabove. Liquid or hardstock sucrose fatty acid esters do not fall within the above definition, but can be used as part of the fat phase.

Liquid sucrose fatty acid esters have an iodine value between about 70 and about 130. These sucrose esters are of the same general type as those described above (i.e., at least four fatty acid groups with 8 to 22 carbons per fatty acid). However, at least about half of the fatty acids of the liquid sucrose esters are unsaturated. Oleic and linoleic acids, and mixtures thereof, are preferred.

Specific liquid sucrose and other polyol fatty acid esters suitable for use herein include sucrose tetraoleate, sucrose pentaoleate, sucrose hexaoleate, sucrose heptaoleate, sucrose octaoleate, glucose tetraoleate, the glucose tetraesters of soybean oil fatty acids (unsaturated), the mannose tetraesters of mixed soybean oil fatty acids, the galactose tetraesters of oleic acid, the arabinose tetraesters of linoleic acid, xylose tetralinoleate, galactose pentaoleate, sorbitol tetraoleate, the sorbitol hexaesters of unsaturated soybean oil fatty acids, xylitol pentaoleate, and mixtures thereof.

Hardstock sucrose and other polyol fatty acid esters have an iodine value not more than about 12. The sucrose fatty acid esters are those described generally above. However, the hardstock esters generally contain fatty acids that are more saturated than unsaturated, and more longer than shorter fatty acid chains. Typical examples of hardstock polyol polyesters include sucrose octastearate, sucrose octapalmitate, sucrose heptastearate, xylitol pentastearate, galactose pentapalmitate, and the like.

Various other additives can be used in the fat phase of the present food or beverage compositions provided that they are edible and aesthetically desirable and do not have any detrimental effects on the compositions. The fat phase can normally contain minor amounts by weight of optional flavorings; anti-spattering agents; anti-stacking agents; anti-oxidants; or the like. As with standard shortenings, nitrogen can also be added to the fat phase during processing.

The fat phase can also be fortified with vitamins and minerals, particularly the fat-soluble vitamins. The fat-soluble vitamins include vitamin A, vitamin D, vitamin K, and vitamin E (tocopherol). Preferably, the fat phase of this invention is fortified with about 1.1 mg. d-alpha tocopheryl acetate per 1000 g sucrose fatty acid ester.

The use of emulsifiers with the present food or beverage compositions has been found to generally enhance the flavor display changes caused by the sucrose esters. The present food or beverage compositions preferably comprise from about 1% to about 5% emulsifier, and more preferably from about 1% to about 3%. Suitable emulsifiers include mono- and diglycerides, lactylated glycerides, and the lower sucrose esters.

A food or beverage composition according to the present invention comprises from about 5% to about 100% fat phase and from about 0% to about 95% other food or beverage ingredients, preferably from about 15% to about 80% fat phase and from about 20% to about 85% other ingredients, and most preferably from about 15% to about 35% fat phase and from about 65% to about 85% other ingredients. The other ingredients can be any standard food or beverage ingredients, provided they include the flavor compounds required herein.

The present food or beverage compositions must contain flavor compounds that are polar or intermediate polarity. It has been found that these polar or intermediate polarity flavor compounds are affected by the present sucrose esters, while nonpolar compounds are not affected. Specifically, the flavor compounds must be at least partially soluble in water. Numerous kinds of food and beverage products will contain these flavor compounds, depending on the ingredient formulations of the products. For example, foor or beverage compositions that can contain these compounds include baked goods and backed good mixes (e.g., cakes, brownies, muffins, cookies, pastries, pies, and pie crusts), shortening and oil products (e.g., shortenings, margarines, frying oils, cooking and salad oils, popcorn oils, salad dressings, and mayonnaise), foods that are fried in oil (e.g., Pringle's potato chips, corn chips, tortilla chips, other fried farinaceious snack foods, french fries, doughnuts, and fried chicken), dairy products and artificial daily products (e.g., butter, ice cream and other fat-containing frozen desserts, yogurt, and cheeses, including natural cheeses, processed cheeses, crean cheese, cottage cheese, cheese foods and cheese spread, milk, cream, sour cream, butter milk, and coffee creamer), meat products (e.g., hamburgers, hot dogs, frankfurters, wieners, sausages, bologna and other luncheon meats, canned meats, including pasta/meat products, stews, sandwich spreads, and canned fish), meat analogs, tofu, and various kinds of protein spreads, sweet goods and confections (e.g., candies, chocolates, chocolate confections, frostings and icings, syrups, cream fillings, and fruit fillings), nut butters and various kinds of soups, dips, sauces and gravies.

ANALYTICAL METHODS

Sensory Profile Method

Food or beverage products are evaluated by 4–5 trained expert panelists using the Sensory Profile Method used within the food and beverage industry. Panelists evaluate each product and identify and define the critical set of attributes for each product. A scale is then developed to evaluate the product. This scale has a range from 0 to 3 with ½ unit increments.

A rating of 0 means the attribute is not present and a rating of 3 is the maximum intensity for that attribute.

The ice cream is flavored by eating a 20–30 gram sample, while margarine and mayonnaise are spread on bread for evaluation.

Time Intensity Profiling Method

Time Intensity Profiling was used to profile the flavor display of chocolate frosting and butter flavored pie crusts. This method involves the correlation of the intensity of flavor perceived over time to the intensity of computer induced sound heard through headphones worn by the panelist.

Before each sample, panelists clear their palates by eating unsalted saltine crackers and drinking water. Samples are served to panelists in a counter balanced manner. A 2–3 minute resting period is given between each sample.

As soon as the sample is placed into the mouth, panelists turn on the computer and use a hand dial to adjust the level of sound they hear in the headphones. As the panelists eat the sample, they adjuste the sound in proportion to the intensity of flavor they perceive. The panelists evaluate the sample until flavor is no longer perceived, even after the food has been swallowed.

The data for each panelist is recorded by computer and statistical analysis is conducted on the combined data.

These panels were conducted using 6–8 panelists that had been trained in the method of time intensity profiling and had been screened for sensory acuity.

Sensory Line Scale Method

A panel of 8–17 people were used to evaluate the frostings. These panelists werre screened for sensory acuity and were trained to evaluate foods.

Before flavoring any frostings, each panelist was given an odor jar to smell. This jar contained the flavor compounds to be assessed. This serves to familiarize the panelist with the flavor component to be evaluated in the frosting. Before flavoring each sample, panelists cleared their palates by eating an unsalted saltine cracker and crinking some water. Samples were served to panelists in a counter balanced order.

Each panelist tasted about 5 grams of frosting and rated the sample using a standard six inch line scale for each of the following attributes:
1. overall flavor intensity
2. time to perceive flavor
3. length of time flavor lasted
4. intensity of flavor aftertaste.

The data from all panelists are combined for statistical analysis.

Rheology Measurements a. Sample Preparation

The sucrose fatty acid ester is heated until it completely melts and is thoroughly mixed. Ten grams of the melted sample is weighed into a pre-heated 20 ml glass vial. The sample is then allowed to recrystallize at 100° F.±5° F. (37.8° C.±3° C.) for 24 hours. After the 24 hour time period has elapsed, the sample is taken to the viscometer and the viscosity and yield stress are measured.

b. Ferranti-Shirley Viscometer Operation Procedure

A Ferranti-Shirley viscometer equipped with a 600 gm torque spring is used for the viscosity and yield stress measurements of the polyol polyester. A cone is put into place, and the viscometer temperature is adjusted to 100° F. (37.8° C.). The chart recorder is calibrated, and the gap between the cone and plate is set. The cone speed is checked, and the cone and plate temperatures are equilibrated to 100° F. (37.8° C.). The panel controls are set. Sufficient sample is placed between the plate and the cone so that the gap is completely filled. The temperature is allowed to stabilize at 100° F. (37.8° C.) for about 30 seconds, and then the cone rotation and recording are started. A rheogram for the polyol polyester is recorded and analyzed to determine the viscosity and yield stress. Viscosity is measured at 10 seconds$^{-1}$ after 10 minutes of steady shear. Yield stress is measured at zero time and is the stress required to achieve deformation flow.

Liquid/Solid Stability Measurement

The sucrose fatty acid ester sample is heated until it completely melts and is thoroughly mixed. The sample is then poured into Beckman #344062 4.4 ml. centrifuge tubes to capacity.

The tubes are immediately transferred to a 100° F.±5° F. (37.8° C.±3° C.) constant temperature room and allowed to recrystallize undisturbed for 24 hours. The samples are then centrifuged at 60,000 rpm in a Beckman Model L8 70M centrifuge having a Beckman Model SW 60 head (Beckman Model SW 60 head (Beckman Instruments, Palo Alto, CA) for one hour at 100° F. (37.8° C.) (the centrifuge and centrifuge head is previously equilibrated at 100° F. [37.8° C.]). The maximum force on the samples is 485,000 G's. (ie., the force at the bottom of the centrifuge tubes) The liquid/solid stability is then calculated as follows:

$$\frac{100 \times (\text{total volume of sample} - \text{volume of liquid})}{\text{total volume of sample}}$$

Polarity of Flavor Compounds

The polarity of the flavor compounds in the present food and beverage compositions is intended to describe the charge asymmetry of the flavor compounds. Asymmetrical molecules have centers of positive and negative charge which do not coincide, giving rise to a permanent dipole moment. The dipole moment of a compound can be quantitated by experimental measurements and calculation. These standard techniques are discussed in physical chemistry texts such as by Castellan, "Physical Chemistry", pp. 461-470 (May 1966), incorporated by reference herein. The dipole moment value of a compound expresses the polarity of the compound. The greater the dipole moment, the greater the polarity of the compound. Greater polarity of a compound may result in increased water solubility.

The following examples are intended only to further illustrate the invention and are not intended to limit the scope of the invention which is defined by the claims.

EXAMPLE 1

Two margarines are prepared, one containing triglycerides and a second containing sucrose fatty acid esters in addition to triglycerides. The margarine compositions are as follows:

|  | Triglyceride Margarine | Sucrose Fatty Acid Ester & Triglyceride Margarine |
|---|---|---|
| Liquid Soybean Oil | 50.0000% | 39.0000% |
| Intermediate Melting Surcrose Fatty Acid Esters |  | 33.5000 |
| Surcrose Fatty Acid Esters Hardstock (I.V. 8) |  | 1.5000 |
| Spring Water | 19.3961 | 19.3292 |
| Partially Hydrogenated Vegetable Oil | 24.0000 |  |
| Salt | 2.7500 | 2.7500 |
| Nonfat Dry Milk | 2.0000 | 2.0000 |
| Stearine | 1.0000 | 1.0000 |
| Monoglyceride Emulsifers | 0.5000 | 0.5000 |
| Corn Syrup Solids | 0.1000 | 0.1000 |
| Potassium Sorbate | 0.1000 | 0.1000 |
| Butter Flavor | 0.1000 | 0.1000 |
| Beta Carotene | 0.0200 | 0.0500 |
| Vitamin E |  | 0.0369 |
| Anhydrous Citric Acid | 0.0300 | 0.0300 |
| Vitamin A Palmitate | 0.0034 | 0.0034 |
| Oil Clary Sage | 0.0005 | 0.0005 |

The intermediate melting sucrose fatty acid esters were made from a blend of partially hardened soybean oil (I.V. 107) methyl esters and nearly completely hardened soybean oil (I.V. 8) methyl esters in about a 55:45 ratio. The octaester content of the sucrose esters was 93.9%, the iodine value was 44.5, the yield stress was about 540 dynes/cm$^2$, the viscosity was 54 poise, and the liquid/solid stability was 94%.

The sucrose fatty acid esters (intermediate melting and hardstock) or partially hydrogenated vegetable oil and monoglyceride emulsifier are heated in a kettle to about 160° F. (71° C.). When melted, the flavorings, vitamins, and liquid soybean oil are added. Separately, the dry ingredients are milled together in a mill or mixer and are dissolved in boiling water to form a slurry. This slurry is added to the melted oils, cooled to 80° F. (27° C.), and homogenized. The product is packaged and tempered at 70° F. (21° C.) for at least 18 hours and then placed at 40° F. (4° C.) for an additional 24 hours.

The same flavor was used in both margarines. When flavored by trained panelists using the Sensory Profile Method, the type of flavors and the order the flavors are displayed are different for margarine containing sucrose fatty acid esters relative to the margarine containing only triglycerides. The types of flavors and order of flavor display are as follows:

| Margarine Flavor Profile | | |
|---|---|---|
| Order | Triglyceride Margarine | Score |
|  | Overall Flavor Amplitude | 1 |
| 1 | Salty | 2½ |
| 2 | Diacetyl | 1½ |
| 3 | Oily and Oily Mouthfeel | 1½ |

| | Margarine Flavor Profile | |
|---|---|---|
| 4 | Salivating | 1½ |
| 5 | Sour | 1 |
| 6 | Cheesy | 1 |
| 7 | Sweet Aromatic Fruity | ½ |
| 8 | Throat catch | 1 |
| 9 | — | |
| 10 | — | |
| Order | Sucrose Fatty Acid Ester and Triglyceride Margarine | Score |
| | Overall Flavor Amplitude | 1 |
| 1 | Powdery | 2 |
| 2 | Diacetyl | 1 |
| 3 | Sweet | ½ |
| 4 | Oily/Waxy Mouth Coating | 1½ |
| 5 | Oxidized Oil/Waxy | 1 |
| 6 | Salivating | 1 |
| 7 | Salty | 1½ |
| 8 | Sour | 1 |
| 9 | Starchy | 1½ |
| 10 | Throat Irritation | 1 |

The sucrose fatty acid ester-containing margarine differences include: postponed perception of salty and sour flavors, suppression of cheesy flavor below the threshold perception limit, and earlier perception of a sweet flavor. The intensity of salty flavor is also suppressed.

EXAMPLE 2

Two ice creams are prepared, one containing triglycerides (butter fat) and the second containing sucrose fatty acid esters in addition to triglycerides. The ice cream compositions are as follows:

| | Triglyceride Ice Cream | Sucrose Fatty Ester and Triglyceride Ice Cream |
|---|---|---|
| Cream (40% fat) | 36.708% | 15.830% |
| Milk (3.4% fat) | 13.938 | 24.890 |
| Liquid Sugar | 14.934 | 14.934 |
| Water | 11.946 | 13.863 |
| Condensed Skim Milk | 11.250 | 11.250 |
| Intermediate Melting Sucrose Fatty Acid Ester | — | 8.000 |
| Sweetened Whole Condensed Milk | 4.978 | 4.978 |
| Corn Syrup | 2.987 | 2.987 |
| Egg Yolks (10% sugared) | 1.493 | 1.493 |
| Sucrose | 0.996 | 0.996 |
| Gelatin | 0.199 | 0.199 |
| Polysorbate 60 | 0.058 | 0.058 |
| Monoglyceride Emulsifier | 0.058 | 0.058 |
| Carrageenan | 0.015 | 0.015 |
| Vitamin E | | 0.009 |
| Vanilla | 0.400 | 0.400 |
| Colorant | 0.040 | 0.040 |

Mix half of sucrose, carrageenan, and liquid sugar together. Mix remaining half of sucrose, gelatin, and hot water (<190° F., <88° C.) together. Combine the carrageenan mix, gelatin mix, and all remaining ingredients (the milks, cream, corn syrup, egg yolks, sucrose fatty acid ester, polysorbate 60, emulsifier, and vitamins) in a vat pasteurizer. Heat the mix to 165° F. (74° C.) for 30 minutes, then homogenized at 2000/500 PSI. Slowly cool the mix to 80°-90° F. (27°-32° C.). Store overnight at 40° F. (4° C.). Add colorant and vanilla to mix and then freeze with desired overrun (amount of included air). Pack product and store at 0° F. (−18° C.) or colder.

When the two ice creams are flavored by trained panelists, using the Sensory Profile Method, the type of flavors perceived and the order of flavor display are different for the ice cream prepared with sucrose fatty acid ester compared to the ice cream prepared with only triglycerides.

| | Ice Cream Flavor Profile | |
|---|---|---|
| Order | Triglyceride Ice Cream | Score |
| | Overall Flavor Amplitude | 1½ |
| 1 | Sweet | 2 |
| 2 | Vanilla | 2 |
| 3 | Cream | 1½ |
| 4 | Sour | 1 |
| 5 | Astringent | 1 |
| 6 | Eggy | 1 |
| 7 | Fatty, Waxy Mouthfeel | 1 |
| 8 | Drying | 1½ |
| Order | Sucrose Fatty Acid Ester and Triglyceride Ice Cream | Score |
| | Overall Flavor Amplitude | ½ |
| 1 | Sweet, Cloying | 2 |
| 2 | Vanillin | 1 |
| 3 | Oxidized Oil | 1½ |
| 4 | Waxy, Fatty | 1½ |
| 5 | Starch/Drying Mouthfeel | 1½ |
| 6 | Sour | 1 |
| 7 | Throat Catch | 1 |
| 8 | Bitter | ½ |

The overall flavor amplitude is significantly lower for the sucrose fatty acid ester ice cream, nd vanillin (a major component of vanilla) is perceived instead of vanilla as in the triglyceride ice cream. In addition, sour flavor is postponed, drying occurs earlier, and eggy flavor is eliminated.

EXAMPLE 3

Chocolate frostings are prepared with two shortenings, a first shortening containing only triglyceride fat and a second shortening containing sucrose fatty acid esters in addition to triglycerides. The compositions of the shortenings are as follows:

| | Triglyceride Shortening | Sucrose Fatty Acid Ester & Triglyceride Shortening |
|---|---|---|
| Liquid Soybean Oil (I.V. 107) | 58.0% | 58.0% |
| Intermediate Melting Soybean Oil (I.V. about 43) | 35.5 | |
| Palm Hardstock (I.V. <4) | 6.5 | 6.5 |
| Intermediate Melting Sucrose Fatty Acid Ester (I.V. about 43) | | 35.5 |

The intermediate melting sucrose ester was made from a blend of partially hardened soybean oil (I.V. 107) methyl esters and nearly completely hardened soybean oil (I.V. 8) methyl esters in about a 55:45 ratio. The octaester content of the sucrose ester was 84.7%, its iodine value was 47.8, its yield stress was 657 dynes/cm$^2$, its viscosity was 43.1 poise, and its liquid/solid stability was 98%.

The shortenings are prepared by melting all ingredients together. These ingredients are then plasticized by cooling them to about 52° F. (11° C.) in a mixer. The shortening is packed into cans, sealed with nitrogen, and tempered at 85° F. (29° C.) for 48 hours.

The chocolate frosting recipe is as follows:

| Ingredient | Percent |
|---|---|
| Baker's Unsweetened Chocolate | 14.1% |
| Shortening (either triglyceride or sucrose fatty acid ester plus triglyceride) | 15.1 |
| Powdered sugar | 62.7 |
| Salt | 0.6 |
| Water | 7.5 |

The frostings are prepared as follows: Melt chocolate. Blend shortening and melted chocolate together using a mixer. Add half of sugar, salt and mix about 30 seconds on medium-high speed. Add water and the remaining sugar: blend on medium-high for one minute.

When the two samples are flavored by trained panelists, using the Time Intensity Profiling Method, the frosting made with shortening containing sucrose fatty acid ester is perceived to have significantly less total chocolate flavor and the duration of time chocolate flavor is perceived is significantly shorter than the frosting prepared with the triglyceride shortening. The below table shows these differences. In addition, the time to perceive the maximum intensity of chocolate flavor is significantly shorter in the frosting prepared with shortening containing sucrose fatty acid ester than with the frosting prepared with triglyceride shortening.

| Time Intensity Profile Chocolate Frostings | | | |
|---|---|---|---|
| | Triglyceride* | | Sucrose Fatty Acid Ester & Triglyceride* |
| Total Chocolate Flavor | 27763 | s | 19059 |
| Duration of Chocolate Flavor | 378 | s | 275 |
| Lag Time | 22 | | 23 |
| Maximum Chocolate Intensity | 100 | | 91 |
| Time of Maximum Chocolate Intensity | 223 | s | 166 | s—significant at 90% confidence
*—results are recorded in time limits = 500 msec

EXAMPLE 4

Pie crusts are prepared with two different butter flavored shortenings, a first shortening containing only triglyceride fat and a second shortening containing sucrose fatty acid esters in addition to triglycerides. The compositions of these shortenings and the method of preparation is the same as in Example 3. 123.0 ppm of butter flavor is added to each shortening. P The pie crust recipe is as follows:

| Ingredient | Percent |
|---|---|
| Shortening (either triglyceride or sucrose fatty acid ester plus triglyceride) | 33.4% |
| Flour | 50.4 |
| Salt | 0.9 |
| Water | 15.3 |

The pie crusts are prepared as follows:
Using a pastry blender, cut shortening into flour and salt until mixture resembles small peas. Add ½ of water and mix with a fork. Repeat until all the water has been added. Mix dough with a fork until a ball is formed. Spread ¼ to ½ teaspoon of flour on wax paper. Roll dough out onto paper. Bake at 425° F. (218° C.) for 15 minutes in a 9" glass pie plate.

When the pie crusts are flavored by trained panelists, using the Time Intensity Profiling Method, the pie crust prepared with shortening containing sucrose fatty acid esters has a significantly greater maximum butter flavor intensity when the pie crust prepared with triglyceride shortening. The table below illustrates this.

| Time Intensity Profile Butter Pie Crusts | | | |
|---|---|---|---|
| | Triglyceride* | | Sucrose Fatty Acid Ester & Triglyceride* |
| Total Butter Flavor | 14258 | | 16687 |
| Duration of Butter Flavor | 294 | | 273 |
| Lag Time | 25 | | 36 |
| Maximum Butter Intensity | 62 | s | 80 |
| Time of Maximum Butter Intensity | 184 | | 178 | s—significant at 90% confidence
*—results are recorded in time limits = 500 msec

EXAMPLE 5a

Polar Flavor Compound

Based on learnings from the above examples, further work was undertaken to evaluate the classes of flavor components whose flavor perception was affected by the presence of sucrose fatty acid esters.

Frostings were prepared, one containing triglycerides and the second containing sucrose fatty acid esters in addition to triglycerides. The method of preparation is the same as described in Example 3, but the compositions are as follows:

| | Triglyceride Frosting | Sucrose Fatty Acid Esters & Triglyceride Frosting |
|---|---|---|
| Water | 10.1% | 10.1% |
| Salt | 0.7 | 0.7 |
| Powdered Sugar | 71.9 | 71.9 |
| Intermediate Melting Sucrose Fatty Acid Esters | | 6.0 |
| Intermediate Melting Triglycerides | 6.2 | |
| Liquid Soybean Oil | 10.0 | 9.8 |
| Palm Hardstock | 1.1 | 1.5 |

The intermediate melting sucrose fatty acid ester was the same as in Example 3.

Single component flavor compounds were added in equal amounts to each of these frosting formulations for the purpose of determining if the polarity of the flavor compound affected flavor perception. Polar, intermediate-polarity, and nonpolar flavor compounds were tested. The flavors were added by diluting them in triglyceride fat and melting them with the other shortening ingredients.

Vanillin, a polar flavor compound, was evaluated in the triglyceride frosting and the frosting containing sucrose fatty acid esters and triglycerides. Each frosting contained only the vanillin flavor at a level of 287.8 ppm.

When flavored by a panel of sensory judges by the Line Scale Method, the frosting prepared with sucrose fatty acid esters had a significantly higher intensity of vanillin than the triglyercide frosting even though each frosting contained the same amount of vanillin.

Also, more panelists said the sucrose fatty acid ester frosting had a shorter time to initially perceive vanillin and a longer vanillin retention than the triglyceride frosting.

| | Triglyceride Frosting | | Sucrose Fatty Acid Ester & Triglyceride Frosting |
|---|---|---|---|
| % of Panelists | | | |
| More Vanillin Flavor | 25% | | 75% |
| Shorter Time to Perceive Vanillin | 33 | | 67 |
| Longer Vanillin Retention | 25 | | 75 |
| Stronger Vanillin Aftertaste | 42 | | 58 |
| Mean Scale Rating (low rating-high rating) | | | |
| Vanillin Intensity (weak-strong) | 31 | s | 39 |
| Time to Perceive Vanillin (fast-slow) | 28 | | 20 |
| Total time Vanillin Perceived (short-long) | 33 | | 37 |
| Intensity of Vanillin Aftertaste (weak-strong) | 29 | | 29 | s—significant at 95% confidence

EXAMPLE 5b

Intermediate-Polarity Compound

Diacetyl, an intermediate-polarity flavor compound, was evaluated in the triglyceride frosting and the sucrose fatty acid ester plus triglyceride frosting. Each frosting contained only the diacetyl flavor at a level of 38.37 ppm and was prepared in the same manner as described in Example 5a.

When the frostings were flavored by a panel of sensory judges by the Line Scale Method, the frosting prepared with sucrose fatty acid esters had a significantly higher intensity of diacetyl than the triglyceride shortening even though each frosting contained the same amount of diacetyl. Also, significantly more panelists said the sucrose fatty acid ester frosting displayed the diacetyl for a longer time. In addition, the sucrose fatty acid ester frosting initially displayed the diacetyl in a shorter time and had a stronger aftertaste of diacetyl.

| | Triglyceride Frosting | | Sucrose Fatty Acid Ester & Triglyceride Frosting |
|---|---|---|---|
| % of Panelists | | | |
| More Diacetyl Flavor | 0% | s | 100% |
| Shorter Time to Perceive Diacetly | 20 | | 80 |
| Longer Diacetyl Retention | 10 | s | 90 |
| Stronger Diacetyl Aftertaste | 20 | | 80 |
| Mean Scale Rating (low rating-high rating) | | | |
| Diacetyl Intensity (weak-strong) | 24 | s | 35 |
| Time to Perceive Diacetyl (fast-slow) | 29 | | 21 |
| Total Time Diacetyl is Perceived (short-long) | 24 | | 33 |
| Intensity of Diacetyl Aftertaste (weak-strong) | 19 | | 25 | s—significant at 95% confidence

EXAMPLE 5c

Non-polar Compound

Isoamyl butyrate, a nonpolar flavor compound was evaluated in the triglyceride frosting and the frosting containing sucrose fatty acid esters plus triglyceride. Each frosting contained only this isoamyl butyrate flavor at a level at 86.33 ppm and was prepared in the same manner as described in Example 5a.

When flavored by a panel of sensory judges by the Line Scale Method, no differences were detected between the triglyceride frosting and the frosting containing sucrose fatty acid ester.

| | Triglyceride Frosting | Sucrose Fatty Acid Ester & Triglyceride Frosting |
|---|---|---|
| % of Panelists | | |
| More Isoamyl Butyrate Flavor | 54% | 46% |
| Shorter Time to Perceive Isoamyl Butyrate | 54 | 46 |
| Longer Isoamyl Butyrate Retention | 54 | 46 |
| Stronger Isoamyl Butyrate Aftertaste | 63 | 37 |
| Mean Scale Rating (low rating-high rating) | | |
| Isoamyl Butyrate Intensity (weak-strong) | 22 | 21 |
| Time to Perceive Isoamyl Butyrate (fast-slow) | 37 | 39 |
| Total Time Isoamyl Butyrate Perceived (short-long) | 25 | 21 |
| Intensity of Isoamyl Butyrate aftertaste (weak-strong) | 23 | 18 |

EXAMPLE 6

Three butter flavored frostings were prepared, one containing sucrose fatty acid ester with an octaester level of 56% and triglyceride, a second containing sucrose fatty acid ester with an octaester level of 85% and triglyceride, and a third containing only triglyceride. The compositions of these frostings are as follows:

| | Triglyceride Frosting | 56% Octaester Sucrose Fatty Acid Ester Frosting | 85% Octaester Sucrose Fatty Acid Ester Frosting |
|---|---|---|---|
| Water | 10.1% | 10.1% | 10.1% |
| Salt | 0.7 | 0.7 | 0.7 |
| Powdered Sugar | 71.9 | 71.9 | 71.9 |
| Intermediate Melting Sucrose Fatty Acid Ester (octa level = 56%) | | 6.0 | |
| Intermediate Melting Sucrose Fatty Acid Ester (octa level = 85%) | | | 6.0 |
| Liquid Triglyceride Oil | 10.0 | 9.8 | 9.8 |
| Palm Hardstock | 1.1 | 1.5 | 1.5 |
| Intermediate Melting Triglyceride | 6.2 | | |
| Butter Flavor | 123.0 ppm | 123.0 ppm | 123.0 ppm |

The sucrose fatty acid esters, triglycerides, and butter flavors are melted together. This mixture is then cooled in an ice bath until the mixture solidifies. Once solidified, the mixture is blended with a mixer until smooth and creamy. Add ½ sugar and salt and mix about 30 seconds on medium-high. Add remaining sugar and water and mix on medium-high for about one minute.

When flavored by a panel of sensory judges by the Line Scale Method, the frosting containing 85% octaester sucrose fatty acid ester had a greater intensity of butter flavor and a longer display of butter flavor than the frosting containing triglycerides only even though both frostings contained the same amount of butter flavor.

When flavored by the same panel of sensory judges, the frosting containing 56% octaester sucrose fatty acid polyester was not different from the triglyceride frosting.

|  | 85% Octaester Sucrose Fatty Acid Ester/ Triglyceride | 56% Octaester Sucrose Fatty Acid Ester/ Triglyceride |
|---|---|---|
| % Panelists |  |  |
| More Butter Flavor | 67%/33% | 41%/59% |
| Shorter Time to Perceive Butter Flavor | 58%/42% | 59%/41% |
| Longer Butter Retention | 75%/25% | 53%/47% |
| Stronger Butter Aftertaste | 58%/42% | 65%/35% |
| Mean Scale Rating (low rating–high rating) |  |  |
| Butter Intensity (weak–strong) | 37/30 | 31/34 |
| Time to Perceive Butter Flavor (fast–slow) | 23/27 | 24/24 |
| Total Time Butter Flavor Perceived (short–long) | 37/29 | 34/32 |
| Intensity of Butter Aftertaste (weak–strong) | 34/28 | 31/29 |

What is claimed is:

1. An edible composition with altered flavor display selected from the group consisting of foods and beverages, wherein the composition comprises:
   (A) from about 5% to about 100% fat phase, wherein the fat phase comprises:
      (i) from about 5% to about 95% sucrose fatty acid ester containing at least four fatty acid ester groups, each fatty acid group having from about 8 to about 22 carbon atoms, wherein the sucrose fatty acid ester has an octaester content of at least about 75% and an iodine value between about 25 and 55, and wherein the sucrose fatty acid ester has, at 100° F. (37.8° C.):
         (a) a viscosity of not less than 15 poise at 100° F. (37.8° C.) after 10 minutes of steady shear at a shear rate of 10 sec.$^{-1}$,
         (b) a liquid/solid stability of not less than 50 percent at 100° F. (37.8° C.);
      (ii) wherein the sucrose fatty acid ester comprises not more than about 50% of the total edible composition;
      (iii) from about 5% to about 95% triglyceride fat; and
      (iv) from about 0% to about 50% fat ingredients selected from the group consisting of fatty acids, fatty alcohols, esters of fatty acids, esters of fatty alcohols, noncaloric fats, reduced calorie fats, polyol fatty acid polyesters not meeting the limitations of subpart (i) of claim 1 hereinabove, and mixtures thereof;
   (B) from about 0% to about 95% nonfat ingredients selected from the group consisting of nonfat food ingredients and nonfat beverage ingredients, and mixtures thereof; and
   (C) wherein the edible composition contains flavor compounds having a polarity not less than the polarity of diacetyl (octanol/water partition coefficient not more than 0.037).

2. A composition according to claim 1 comprising from about 15% to about 80% fat phase and from about 20% to about 85% nonfat ingredients.

3. A composition according to claim 2 comprising from about 15% to about 35% fat phase and from about 65% to about 85% nonfat ingredients.

4. A composition according to claim 1 wherein the fat phase comprises from about 10% to about 67% sucrose fatty acid ester and from about 33% to about 90% triglyceride fat.

5. A composition according to claim 4 wherein the fat phase comprises from about 10% to about 35% sucrose fatty acid ester and from about 65% to about 90% triglyceride fat.

6. A composition according to claim 1 wherein the ratio of sucrose fatty acid ester to triglyceride fat is not more than about 2:1.

7. A composition according to claim 6 wherein the ratio of sucrose fatty acid ester to triglyceride fat is not more than about 1:1.

8. A composition according to claim 1 wherein the sucrose fatty acid ester has an octaester content of at least about 80%.

9. A composition according to claim 8 wherein the sucrose fatty acid ester has an octaester content of at least about 85%.

10. A composition according to claim 1 wherein the sucrose fatty acid ester comprises not more than about 35% of the total food or beverage composition.

11. A composition according to claim 10 wherein the sucrose fatty acid ester comprises from about 3% to about 15% of the total food or beverage composition.

12. A composition according to claim 1 wherein the flavor compounds have a dipole moment greater than zero, are of intermediate polarity, and are at least slightly soluble in water.

13. A composition according to claim 12 wherein the flavor compounds have a dipole moment greater than zero, are highly polar and are at least slightly soluble in water.

14. A composition according to claim 1 additionally comprising from about 1% to about 5% emulsifier.

15. A composition according to claim 14 wherein the composition additionally comprises from about 1% to about 3% emulsifier.

16. A composition according to claim 1 wherein the sucrose fatty acid ester has a yield stress of not less than 150 dynes/cm$^2$ at 100° F. (37.8° C.).

* * * * *